US008181743B2

(12) United States Patent
duCellier

(10) Patent No.: US 8,181,743 B2
(45) Date of Patent: May 22, 2012

(54) PORTABLE TREE STAND

(76) Inventor: Jason duCellier, Edgewater, MD (US)

( * ) Notice: Subject to any disclaimer, the term of this patent is extended or adjusted under 35 U.S.C. 154(b) by 1028 days.

(21) Appl. No.: 12/078,263

(22) Filed: Mar. 28, 2008

(65) Prior Publication Data

US 2008/0236948 A1  Oct. 2, 2008

Related U.S. Application Data

(60) Provisional application No. 60/907,372, filed on Mar. 29, 2007.

(51) Int. Cl.
*E04G 3/28* (2006.01)
(52) U.S. Cl. ........................................ 182/187; 182/188
(58) Field of Classification Search .................. 182/187, 182/188
See application file for complete search history.

(56) References Cited

U.S. PATENT DOCUMENTS

| 2,855,980 | A | * | 10/1958 | Konieczka | ................ | 248/230.8 |
|---|---|---|---|---|---|---|
| 3,115,213 | A | | 12/1963 | Cloutier | | |
| 3,854,551 | A | | 12/1974 | Lindow | | |
| 3,885,649 | A | | 5/1975 | Damron | | |
| 4,244,445 | A | | 1/1981 | Strode | | |
| 4,409,907 | A | | 10/1983 | Norton | | |
| 5,078,232 | A | | 1/1992 | Hancosky | | |
| 5,338,133 | A | | 8/1994 | Tornero | | |
| 5,518,083 | A | | 5/1996 | Blennert | | |
| 5,538,101 | A | * | 7/1996 | Kempf | ........................ | 182/116 |
| 5,562,180 | A | | 10/1996 | Herzog et al. | | |
| 5,673,966 | A | | 10/1997 | Morton, Jr. | | |
| RE36,276 | E | | 8/1999 | Smith | | |
| 6,668,977 | B2 | | 12/2003 | Arsenault | | |
| 2005/0039985 | A1 | * | 2/2005 | Butterworth | ................ | 182/187 |
| 2005/0167200 | A1 | * | 8/2005 | McFall et al. | ................ | 182/187 |
| 2006/0196726 | A1 | * | 9/2006 | Pestrue | ........................ | 182/187 |

* cited by examiner

*Primary Examiner* — Alvin Chin Shue
(74) *Attorney, Agent, or Firm* — Roylance, Abrams, Berdo & Goodman, L.L.P.

(57) ABSTRACT

A pole or tree mounted device having a platform assembly at a lower position, and a seat assembly at an upper position. The seat assembly includes a seat brace, seat, and armrests and a leveler for assisting in securing and leveling the seat in a desired position, and the platform assembly includes a platform positioned substantially perpendicular to an outer surface of the tree or pole, and at least two braces positioned beneath the platform, wherein a first brace is secured in a substantially vertical position along an outer surface of the tree and is secured to an inner edge of the platform. The second brace is secured at some angle relative to the outer surface of the tree to extend from a lower position of the first brace to an outer edge of the platform. A leveler is provided to effectively level the platform as desired by the user.

11 Claims, 11 Drawing Sheets

PORTABLE TREE STAND

CROSS-REFERENCE TO RELATED APPLICATION

The present application claims the benefit under 35 U.S.C. §119(e) of U.S. Provisional Patent Application No. 60/907,372, filed Mar. 29, 2007, the entire disclosure of which is incorporated herein by reference.

BACKGROUND OF THE INVENTION

1. Field of the Invention

The present invention relates to a tree or pole mountable seat. More specifically, the present invention relates to a tree or pole mountable seat having easily separated components to allow one or more duplicate components to be used at various locations, and remaining components that can be easily moved between locations and used with the duplicate components at each location.

2. Description of the Related Art

A number of difficulties arise in the construction and safe use of portable, semi-portable, and permanent tree or pole mounted stands, upon which a user can sit at an elevated position. Such concerns typically focus upon safety and convenience. A number of techniques, therefore, have been set forth to address one or both of these issues.

For example, U.S. Pat. No. Re 36,276 of Smith describes an apparatus that uses a brace that is above the platform with cables coming down from above that hinder entering the stand. There are also two slots that adjust platform level. A quick disconnect combination of cable and chain that goes around the tree has two cleats that slide into the chain and cable. The downward pressure on the chain secures the stand to the tree causing the stand to move. However, this does not present a rigid mount, and seat height is not adjustable. Further, no armrests are provided.

In yet another technique, U.S. Pat. No. 3,115,213 of Cloutier describes an apparatus wherein a brace comes up from the tree to an outer end of the seat. This bar has an oblong slot cut into it for adjusting the angle of the seat. It uses a nut and bolt system, which requires a wrench for locking the device. However, the seat does not flip up and there are no armrests.

In still another technique, U.S. Pat. No. 5,562,180 of Herzog et al., describes an apparatus wherein a stand brace is provided that comes up from the platform with cables holding up the platform. The cables slip into a slot for quick removal. The seat can be removed by pulling a pin and the platform can be removed by pulling a pin from the bottom of the down brace which can remain on the tree. However, this device has no leveling means for either the seat or the platform. Further, the cables can be tripped over and allow the platform to flex and twist. Such cables also have a tendency to break or slip out of connecting and crimped ends without warning. Further, in this apparatus, the seat has no armrests nor is the seat height adjustable. It is unclear if quick pins or bolted areas are sleeved and as such, construction materials, such as aluminum in such a device, can be prone to distorting holes if not sleeved because the bolts are not supported over the entire length of the piece.

In still another technique, U.S. Pat. No. 6,668,977 of Arsenault describes a more complicated apparatus possibly requiring two or more people for installation. Further, the apparatus must be put up in advance because there are no quick disconnects for easy moving of the stand and no leveling of the platform. There are many quick pins that tend to allow movement and noise at connection points. It also does not appear to have a seat, and methods for entering the stand are unclear. For example, it appears that screw in steps or a ladder for entry will come up under the platform and not to an edge.

In still another technique, U.S. Pat. No. 5,673,966 of Morton simply describes a seat which is pushed into the ground, and has no features for attachment to a tree. It does not flip up and has no armrests. In still another technique, U.S. Pat. No. 4,409,907 of Norton describes a table and has no features for a seat or platform.

In still another technique, U.S. Pat. No. 5,518,083 of Blennert describes a seat that can swing left and right, but does not flip up out of the way. Further, the device of Blennert has no armrests. The connection to the tree is provided using a chain, wherein the weight of the seat puts tension on chain, which in some cases does not provide a stable means of attachment.

Armrests in some conventional devices can include a certain degree of adjustability. For example, U.S. Pat. No. 5,338,133 of Tornero describes an armrest uses that uses a lever mechanism for facilitating adjustment.

In still another technique, U.S. Pat. No. 5,078,232 of Hancosky describes a device wherein the stand platform and seat cannot be leveled as required in the case where a mounting tree or pole is leaning. A strap is used to connect the device to the tree, and the seat is not adjustable. There are no quick disconnects for easy moving, and the platform appears to be plywood, which can become slippery when wet. Still further, the back of platform is only supported by one brace that connects to the middle, no armrests are provided, and the seat does not flip up.

In still another technique, U.S. Pat. No. 4,244,445 of Strode describes a stand which is configured to be a climbing tool and stand. The device includes a number of braces under the seat and platform that appear to be mounted in place and are not configured to fold down for compact transporting. The straps or bands that go around tree appear to be on the topside of the platform and seat, which could interfere during use, such as causing a user to trip. The bands further include adjustment holes and quick pins, and not bolts which can be more secure. The pins could fall out causing the platform or seat to fall. This type of device is known for slipping even if it only slips a foot or less. Still further, the device does not provide armrests and does not flip up or down.

In still another technique, U.S. Pat. No. 3,885,649 of Damron describes a device wherein a single brace is provided under the stand from the outer end of the platform to the tree. The brace appears to be held in place with a strap from the back of the stand. There is no strap or chain on the end of this brace. Only the weight of the stand and user holds this in place, so if the strap breaks it will cause a failure of the platform. The back of the platform is secured with a chain and binder, which is heavy and bulky. It does not appear to have a good cleat to cradle the tree and neither a seat nor quick disconnects are provided.

In still another technique, U.S. Pat. No. 3,854,551 of Lindow describes a device wherein a seat and brace have cleats that adjust to the left and right to fit a supporting tree, but do not adjust in and out away from the tree to put tension on a supporting strap or chain. Further it is unclear if the seat flips up and/or down and if it does, there appears to be a bracket that would catch on a user and not allow the user to rest up against the tree. Further, there are no armrests or quick disconnects, and there is no way to level the device.

Accordingly, a need exists for a tree or pole mountable seat and platform having easily separated platform, seat and armrest components to allow one or more duplicate components to be used at various locations, and remaining components that can be easily moved between locations while providing an easy and effective way to install, secure and level the device as desired by a single user.

SUMMARY OF THE INVENTION

Accordingly, exemplary embodiments of the present invention address the above and other issues, and provide a tree or pole mountable seat and platform having easily separated platform, seat and armrest components to allow one or more duplicate components to be used at various locations, and remaining components that can be easily moved between locations while providing an easy and effective way to install, secure and level the device as desired by a single user.

An aspect of exemplary embodiments of the present invention is to provide a platform with at least two braces under the platform. A first brace is provided at the tree surface, and a second brace is provided at the end of the platform and connects the outer edge of the platform to the first brace at the tree surface.

Another aspect of exemplary embodiments of the present invention is to provide the first brace such that it can be easily separated from both the platform and the second brace and remain in position on the tree surface.

Another aspect of exemplary embodiments of the present invention is to provide the platform such that it can be put on another tree having a first brace in place.

Another aspect of exemplary embodiments of the present invention is to provide the platform such that it can be secured to and released from the first and second braces using quick disconnects on the braces and the underside of the platform.

Another aspect of exemplary embodiments of the present invention is to provide the platform with slotted, sleeved brackets, and provide the first and second braces with slightly extended round sleeves at coupling points, such that the slotted, sleeved brackets on the platform receive the slightly extended round sleeves of the first and second braces, and hold the platform unsupported until bolts or pins are inserted making installation easier and safer.

Another aspect of exemplary embodiments of the present invention is to provide the platforms and braces as interchangeable members, such that a user can purchase additional first braces thereby allowing the user to install the first braces on several trees and move the platform and second brace between locations as desired.

Another aspect of exemplary embodiments of the present invention is to provide the first brace with a first securing mechanism at a lower portion of the first brace to firmly press against the tree surface, and a second securing mechanism at an upper portion of the first brace to circumvent the tree and which can be tightened to secure the first brace to the tree surface.

Another aspect of exemplary embodiments of the present invention is to provide the first brace with a leveling mechanism at an upper portion near the platform that moves in and out against the tree surface to adjust the level of the platform angle and to put tension on the second securing mechanism (i.e., a chain attachment to the tree).

Another aspect of exemplary embodiments of the present invention is to provide an attachment chain, strap, cable or other mechanism at the second securing mechanism that can be used by wrapping it around the tree and connecting it to the first brace.

Another aspect of exemplary embodiments of the present invention is to provide the first brace with one or more holes through the first brace at a lower end for receiving an end of the second brace at a selectable height, thereby controlling an angle of rotation and the level of the platform secured at the opposite ends of the first and second braces.

Another aspect of exemplary embodiments of the present invention is to provide the seat assembly having a seat down brace that uses a substantially similar cleat system that the down brace for the platform uses. In the seat assembly, it only uses one cleat instead of two and which is further provided to level the seat. The down brace of the seat also includes quick disconnects to separate the seat from down brace in a manner substantially similar to the engagement between the down brace of the platform and the platform. In doing so, the seat can be moved along with the platform, and both down braces of the seat and platform can be left at locations for future use.

Another aspect of exemplary embodiments of the present invention is to provide first and second armrests which telescope in and out to adjust for different size trees and users, and which can be removed by taking out two disconnect bolts.

Another aspect of exemplary embodiments of the present invention is to provide a seat that is independent of the platform, which allows the user to set the height of the seat as desired, and which can flip up when not in use.

Another aspect of exemplary embodiments of the present invention is to provide the platform and the seat such that the platform, seat and one or more braces of each fold flat and the cleats on the seat lock onto the down brace of the platform for easy transportation.

Another aspect of exemplary embodiments of the present invention is to provide sleeved bolt and pin holes for strength.

Another aspect of exemplary embodiments of the present invention is to provide sleeved quick disconnects that are sleeved with nylon or similar materials to prevent noise and which can be replaced when worn.

To substantially achieve these and other aspects of the present invention, a pole or tree mounted device having a platform assembly at a lower position, and a seat assembly at an upper position is provided. The seat assembly includes a seat brace, seat, and armrests and a leveler for assisting in securing and leveling the seat in a desired position. Further, the platform assembly includes a platform positioned substantially perpendicular to an outer surface of the tree or pole, and at least two braces positioned beneath the platform, wherein a first brace is secured in a substantially vertical position along an outer surface of the tree and is secured to an inner edge of the platform. The second brace is secured at some angle relative to the outer surface of the tree to extend from a lower position of the first brace to an outer edge of the platform. A leveler is provided to effectively level the platform as desired by the user. Further, embodiments of the present invention provide the seat and platform having easily separated components to allow one or more duplicate components to be used at various locations, and remaining components that can be easily moved between locations while providing an easy and effective way to install, secure and level the device as desired by a single user.

BRIEF DESCRIPTIONS OF THE DRAWINGS

These and other objects, advantages and novel features of the invention will become more readily appreciated from the following detailed description when read in conjunction with the accompanying drawings, in which.

Throughout the drawings, like reference numerals will be understood to refer to like parts, components and structures.

DETAILED DESCRIPTION OF EXEMPLARY EMBODIMENTS

As shown in the attached figures, a portable pole or tree mountable stand is provided which includes a platform assembly at a lower position, and a seat assembly at an upper position. In an exemplary embodiment of the present invention, the platform assembly at the lower position can include a platform positioned substantially perpendicular to an outer surface of the tree or pole (hereinafter simply referred to as a tree), and at least two braces positioned beneath the platform, wherein a first brace is secured in a substantially vertical position along an outer surface of the tree and is rotatably secured to an inner edge of the platform. The second brace is secured at some angle relative to the outer surface of the tree to rotatably extend from a lower position of the first brace to an outer edge of the platform. A leveler is provided to effectively level the platform as desired by the user.

Further, in an exemplary embodiment of the present invention, the seat assembly includes a seat that can be positioned substantially perpendicular to an outer surface of the tree, and at least one brace positioned beneath the seat and which is secured in a substantially vertical position along an outer surface of the tree. The brace is rotatably secured to the seat at a point which further includes a leveler to effectively level the seat as desired by the user. In an exemplary embodiment of the present invention, the seat assembly further includes one or more armrests which are removably and slidably adjustable as desired by the user.

Both platform and seat assemblies further include a number of pin and slot, quick connecting/disconnecting mechanisms to simplify the assembly of the device by a user. At most connection points between the first and second braces, and the platform, at least one surface includes a slot, or groove, preferably sleeved with a friction and noise-reducing material such as nylon, to receive a pin, or extended sleeve of a through-hole, such that a preliminary assembly can be achieved using the pin and slot mechanisms prior to final assembly using pins, bolts, or other devices.

Still further, both platform and seat assemblies are configured such that a number of first braces can be installed at a number of various positions, and the remaining components can be compactly arranged to be carried by a user between first brace installation points.

Figure 1:
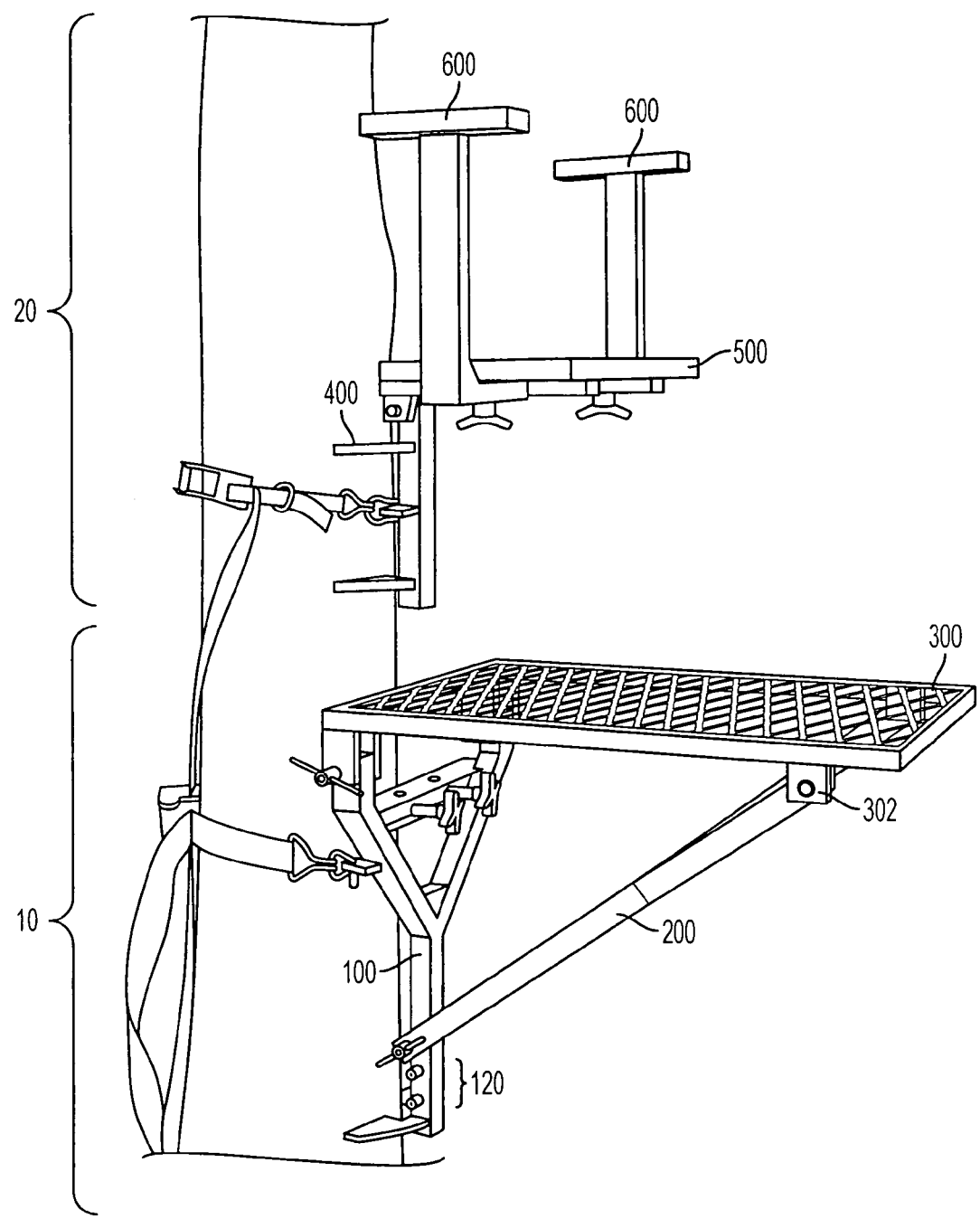
FIG. 1 is a perspective view of an assembled and positioned seat and platform assembly in accordance with an embodiment of the present invention.
Figure 2:
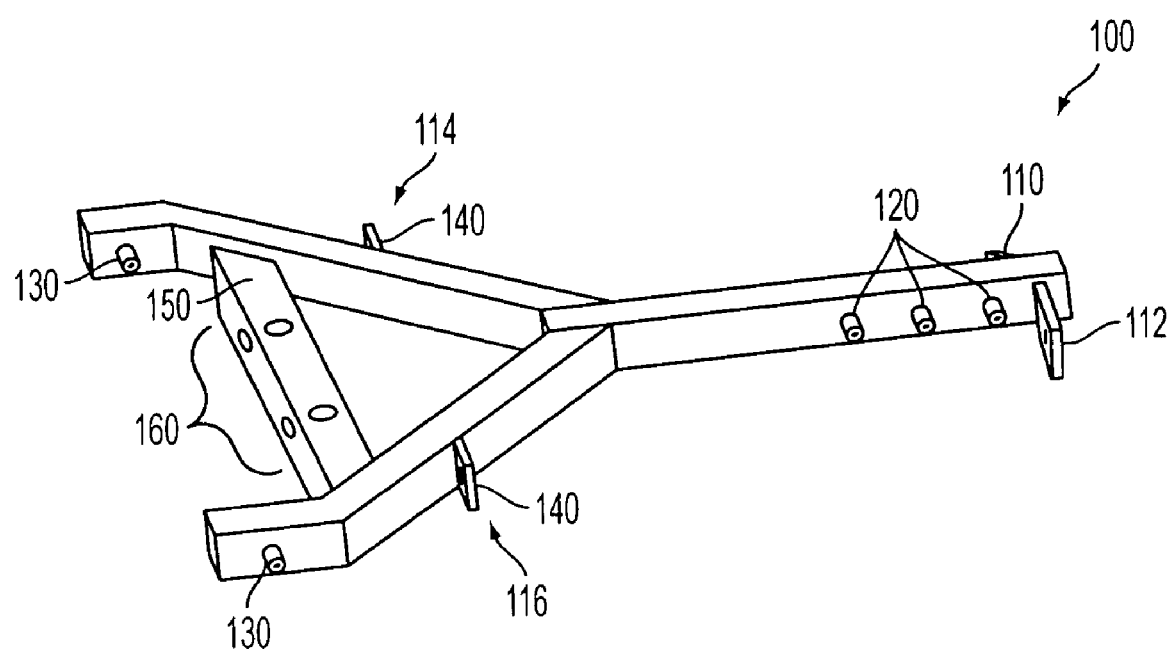
FIG. 2 is a perspective view of a down brace, or first brace, of FIG. 1 in accordance with an embodiment of the present invention.

FIG. 1 is a perspective view of an assembled and positioned seat and platform assembly, and FIG. 2 is a perspective view of a down brace, or first brace, of FIG. 1 in accordance with an embodiment of the present invention. As shown in FIG. 1, exemplary embodiments of the present invention include a platform assembly 10 and a seat assembly 20. A detailed description of each will now be given.

According to an exemplary embodiment of the present invention, the platform assembly 10 includes a first brace 100, a second brace 200, and a platform 300. The first brace 100 includes an upper and a lower portion, wherein the lower portion terminates at the first securing mechanism (see 110 and 112 of FIG. 2) to align the first brace 100 against the curvature of the tree surface and firmly press against the tree surface. The first securing mechanism includes first and second flat members 110 and 112 which are secured to the lower end of the first brace 100 and extend in a perpendicular manner from the first brace 100 and provide a V-shaped opening in which to receive the tree surface. The first and second flat members 110 and 112 include flat stock welded to the first brace 100 to form the V-shape contour in which to receive and secure the tree surface. According to this exemplary embodiment, a number of holes are provided in each of the flat members 110 and 112 to reduce the weight of the device. Further, the bottom cleats or flat members 110 and 112 of the first securing member are preferably flat aluminum stock cut to provide a 22.5 degree angle contact surface with the tree. Although the sizes and dimensions mentioned herein are exemplary and work well, those skilled in the art will understand that other sizes and dimensions can also be used within the scope of this invention.

The first brace 100 further includes a body segment extending upward from the first securing member to a point at which the brace begins to form a V-shape which extends further upward for receiving the back edge of the platform 300 as described in greater detail below. Prior to reaching the point at which the brace begins to form a V-shape, the body segment of the first brace 100 is bisected by one or more through-holes 120. In an exemplary embodiment of the present invention, the through-holes 120 are between ¼ and ⅝ inches in diameter, with a preferred diameter of about ⅜ inches. Each through-hole 120 further includes an insert to minimize friction and prevent wear, and provides for simple repairs when worn. Further, an insert device for each through-hole is provided and which extends a slight distance beyond the surface of the body segment of the first brace 100 to provide a pin-type mechanism to be slidably received within correspondingly sized and positioned grooves in the second brace 200, as described in greater detail below. Each through-hole 120 is drilled to an initial diameter into which a round stock material, such as aluminum round stock, is inserted. The aluminum round stock material is subsequently drilled with the correct hole size. Further, as described in greater detail below, the correspondingly sized and positioned grooves for slidably receiving the pins (e.g., the extended portion of the insert extending a slight distance beyond the surface of the body segment), is sleeved with a friction and noise-reducing material, such as nylon.

The engagement between the pins and grooves allows preliminary assembly of the first and second braces 100 and 200 at the through-holes 120, such that pins, bolts or other securing means can be assembled through the through-holes 120 without requiring extensive user efforts to hold the first and second braces in position during assembly. Further, in accordance with one embodiment of the present invention, the platform 300 is leveled by selecting the desired though-hole 120 for coupling the lower portions of the first and second braces 100 and 200.

In the exemplary embodiment of the present invention shown in FIG. 2, the first brace 100 is between about 23 inches and 32 inches long, and preferably about 26 inches long. At an approximate midpoint of the first brace 100, the body segment of the first brace 100 begins to form a V-shape to continue upward for receiving the back edge of the platform 300. The body segment extends about 15 inches before the V-shape begins. The V-shape extends from the body segment of the first brace 100 to form an approximately 75 degree angle, for a distance of 13½ inches, at which point, each segment of the extended V-shape is redirected substantially parallel to the body segment of the first brace 100 for a distance of 3⅛ inches. The width of the first brace 100 at the extended V-shaped end is about 20⅝ inches wide. The first brace 100, as with the second brace 200 described in greater detail below, is constructed of any suitable material, preferably 1½ inch square aluminum stock to facilitate strength and light weight. The first brace, as with the second brace, can be further treated, for example with paint or similar material, to prevent corrosion and/or provide a friction surface which is easier to grasp and hold.

At the upper portion of each of the substantially parallel segments of the first brace 100, additional through-holes 130 are provided in a manner substantially as described above in regard to the through-holes 120. That is, each through-hole 130 is between ¼ and ⅝ inches in diameter, with a preferred diameter of about ⅜ inches. Each through-hole 130 further includes an insert to minimize friction and prevent wear, and provide for simple repairs when worn. Further, the optional insert of each is provided to extend a slight distance beyond the surface of the body segment of the first brace 100 to provide a pin-type mechanism to be slidably received within correspondingly sized and positioned grooves in the platform 300, as described in greater detail below. The engagement between the pins and grooves allows preliminary assembly of the first brace 100 and the platform 300 at the through-holes 130, such that pins, bolts or other securing means are assembled through the through-holes 130 without requiring extensive user efforts to hold the first brace and platform in position during assembly. Each through-hole 130 is drilled to an initial diameter such that a round stock material, such as aluminum round stock, can be inserted. The aluminum round stock material is then drilled with the correct hole size. Further, as described in greater detail below, the correspondingly sized and positioned grooves for slidably receiving the pins (e.g., the extended portion of the insert extending a slight distance beyond the surface of the body segment), is sleeved with a friction and noise-reducing material, such as nylon.

At the approximate midpoint, the first brace 100 further includes the second securing mechanism to circumvent the tree and which is tightened to secure the first brace 100 to the tree surface. Along the V-shaped body sections which extend upward for receiving the back edge of the platform 300, planar members 114 and 116 are provided for securing a belt, ratchet strap, cable or other means to circumvent the tree and secure the first brace 100 to the tree surface. Each planar member 114 and 116 extends from the V-shape body sections substantially parallel to the platform 300, and includes through-holes 140, which can be formed in a manner substantially the same as those of through-holes 120 and 130. Any number of suitable ratchet strap, belt, chain or cable mechanisms can be used to circumvent the tree and affix to the through-holes 140 of members 114 and 116, and which can further include a tension mechanism to create a degree of tension in the ratchet strap, belt, chain or cable. Strap 117 shown for example in FIG. 4, or a belt, chain or cable is attached with a device such as a clevis 115 on one end, and the other end slides through the hole in the flat stock of the planar member 114 or 116, and is pulled tight then slide into a slot that connects into the hole to lock the strap, belt, chain or cable down. As described in greater detail below, both the platform and seat assemblies use the same strap, belt, chain or cable attachment system.

Figure 3:
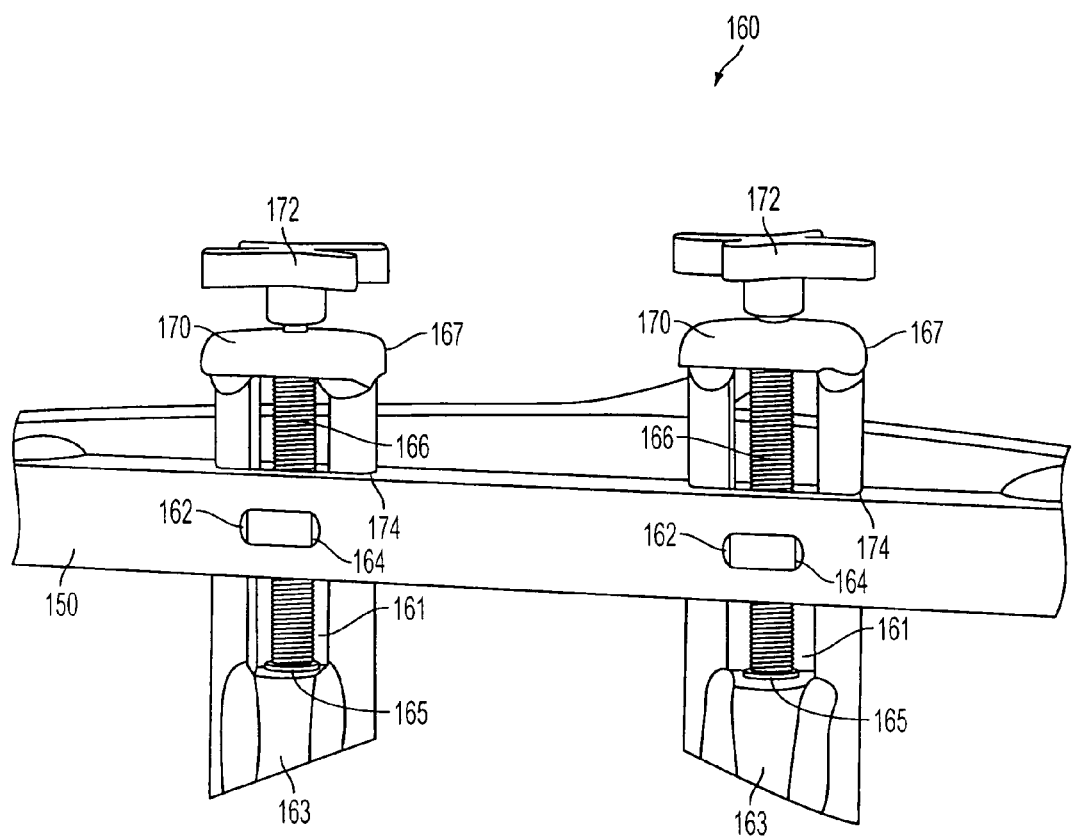
FIG. 3 is a top view of a leveler of the first brace of FIG. 2 in accordance with an embodiment of the present invention.

Still further, at an upper portion, the first member 100 further includes a span member 150 through which a leveling mechanism 160 is installed that is configured to move in and out against the tree surface to adjust the level of the platform angle and to put tension on the second securing mechanism, thereby allowing the user to set the degree of security between the first brace 100 and the tree. FIG. 3 is a top view of the leveler 160 and span member 150 of the first brace 100 in accordance with an embodiment of the present invention.

The span member 150 includes a member extending between the upright V-shape sections of the body of the first brace 100. The span member 150 is secured at opposite ends between the upright V-shape sections of the body. At a substantially midpoint section of the span member 150, a first and second slot 162 of the leveler 160 is provided into which threaded nuts 164 are captured by threaded rods 166. The threaded rods extend between opposite ends of a slide 170. At a first end of the slides 170, knobs 172 are provided to turn the threaded rods 166 engaged with the nuts 164 which serves to move the slides 170 in a back and forth manner. The opposite ends of the slides 170 are configured to provide an angled contact surface to align with a curvature of the tree surface and prevent twisting forces against the leveler 160.

The slides 170 pass though openings 174 in the span member 150, which are provided with inserts 176 (i.e., nylon inserts sized to slidably receive the slides 170 passing through the brace 150) to minimize friction and prevent wear, and provide for simple repairs when worn. By selectively turning one or more of the knobs 172, the slides 170 are moved back and forth within the openings 174 as captured by the nuts 164. When contact between the slides 170 and the tree surface occurs, the span member 150 can be forced away from the tree surface to adjust the level of the platform angle and to put tension on the second securing mechanism (e.g., the strap, belt, chain or cable attachment system), thereby allowing the user to set the degree of security between the first brace 100 and the tree. In an exemplary embodiment of the present invention, the slides 170 include a ⅝ inch flat stock piece that is 2.5 inches wide and 8 inches long, and wherein one end is cut at a 22½ degree angle to contact the tree surface, and the other end is straight. The slides 170 are slotted in the middle and the threaded rods 166, preferably ⅝ inch bolts, are inserted through the slot for adjustment. According to one embodiment, the threaded rods are 4.25 inch bolts that screw in and out to adjust for different sized trees.

Specifically, each slide 170 has a 1¼ inch wide slot 161 cut through the middle of the flat stock. At the end where the slide 170 contacts the tree, round stock pieces 163 are welded in place on the inside of the slot, and into which, a hole is drilled concentric with the axis of the threaded rods 166. Bronze inserts 165, preferably having a ¾ inch outside diameter and a ½ inch inside diameter, are pressed into the holes of the round stock pieces 163. One end of the ⅝ inch bolt 166 is turned down to a reduced diameter (i.e., ½ inches) for a length of about ½ inches, and which is then positioned into the openings of the bronze inserts 165 of the round stock pieces 163.

The other end of the ⅝ inch bolt 166 is also turned down to a reduced diameter (i.e., ½ inches) for a length of ¾ inches to slide through a similar bronze insert on the knob end. This end of the ⅝ inch bolt 166 can then be extended another ½ inches and include ⅜ inch threads on the outer surface upon which the knobs 172 can be threaded.

On the back of each slide 170 at the knob there is a 1 inch thick by 1 inch tall by 2½ inch long cap 167. Each cap 167 is slotted on both sides to slide onto the end of the flat stock of the slide 170, and each includes a ¾ hole concentric with the axis of the threaded rods 166 to accept a bronze insert having a ½ inner diameter through which the end of the ⅝ inch bolt 166 can be extended and upon which the knobs 172 can be threaded. Each cap 167 is welded into place at the end of the slides 170. Although the sizes and dimensions mentioned herein are exemplary, those skilled in the art will understand that other sizes and dimensions can also be used within the scope of this invention.

Figure 6:
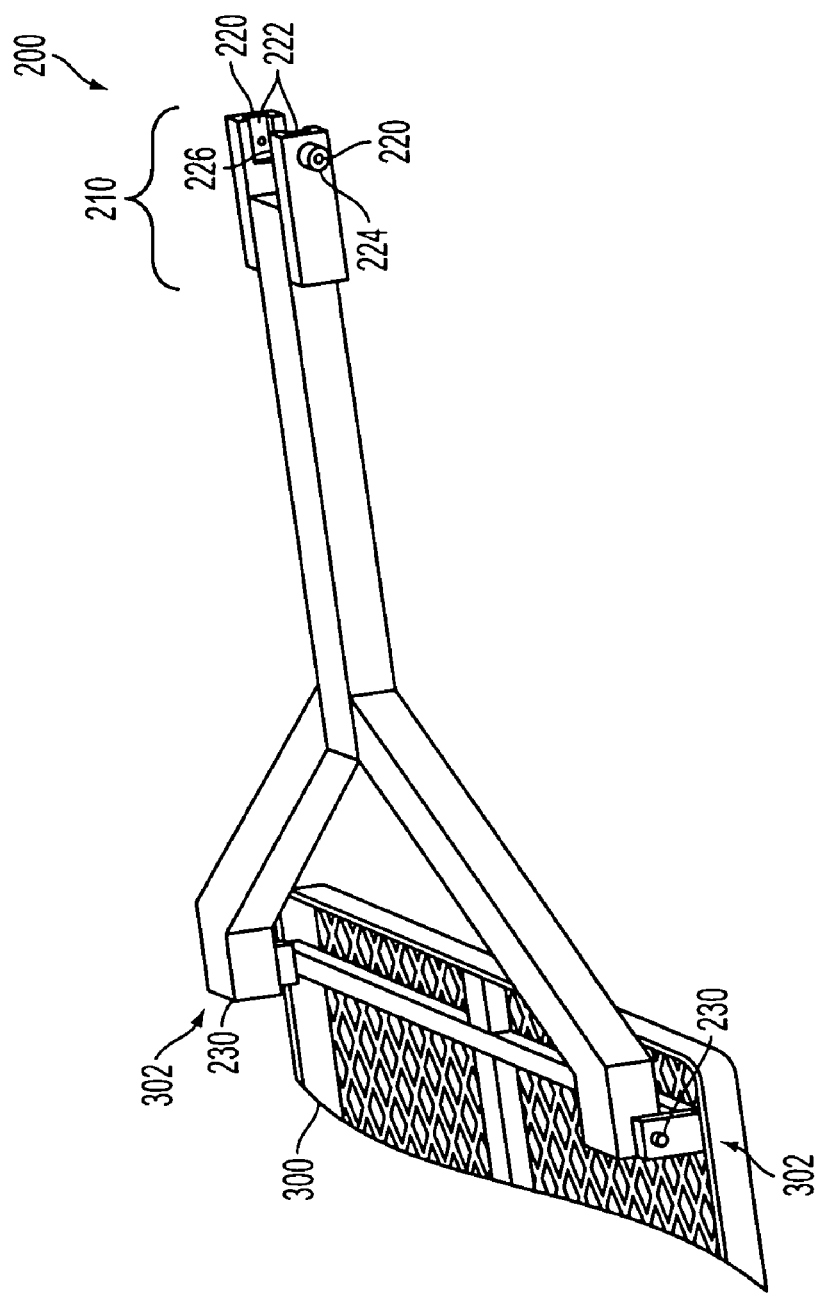
FIG. 6 is a perspective view of an angle brace, or second brace, of FIG. 1 in accordance with an embodiment of the present invention.

Returning to FIG. 1, once the first brace is in position along an outer tree surface using the first securing mechanism at the lower end, and the second securing mechanism at the upper end, and wherein tension and leveling has been performed using the leveler 160, the second brace 200 and platform 300 can be assembled. FIG. 6 is a perspective view of an angle brace, or second brace 200, of FIG. 1 in accordance with an embodiment of the present invention.

In an exemplary embodiment of the present invention shown in FIG. 6, the second brace 200 is between about 26 inches and 38 inches long, and preferably about 32½ inches long. At an approximate midpoint of the second brace 200, the body segment of the second brace 200 begins to form a V-shape to continue upward for receiving the front edge of the platform 300. The body segment extends about 18 inches before the V-shape begins. The V-shape extends from the body segment of the second brace 200 to form an approximately 75 degree angle, for a distance of 13½ inches, at which point, each segment of the extended V-shape is redirected substantially parallel to the body segment of the second brace 200 for a distance of 3⅛ inches. The width of the second brace 200 at the extended V-shaped end is about 20⅝ inches wide. The second brace 200, as with the first brace 100 described above, is constructed of any suitable material, preferably 1½ inch square aluminum stock to facilitate strength and light weight. The first brace, as with the second brace, can be further treated to prevent corrosion and/or provide a friction surface which is easier to grasp and hold.

At the upper portion of each of the substantially parallel segments of the second brace 200, additional through-holes 230 are provided and can be configured as simple rotatable connection means between the second brace 200 and platform 300, or can be provided in a manner substantially as described in regard to the through-holes 130 at the upper portion of the first brace 100. That is, each through-hole 230 can be between ¼ and ⅝ inches in diameter, with a preferred diameter of about ⅜ inches. Each through-hole 230 can further include an insert to minimize friction and prevent wear, and provide for simple repairs when worn. Further, the insert of each can be provided to extend a slight distance beyond the surface of the body segment of the second brace 200 to provide a pin-type mechanism to be slidably received within correspondingly sized and positioned grooves in the platform 300 as described in greater detail below. The engagement between the pins and grooves allows preliminary assembly of the second brace 200 and the platform 300 at the through-holes 230, such that pins, bolts or other securing means can be assembled through the through-holes 230 without requiring extensive user efforts to hold the second brace and platform in position during assembly. In an exemplary embodiment of the present invention, the second brace 200 and the platform 300 are simply provided with rotatable connection means using though holes 230 and once assembled, remain assembled for greater user convenience.

At an opposite end, the second brace 200 includes a lower portion that terminates at a yolk 210. The yolk 210 is configured to receive the lower portion of the first brace 100 therein. Specifically, the yolk 210 includes through-holes 220 that can be between ¼ and ⅝ inches in diameter, with a preferred diameter of about ⅜ inches. Each through-hole 220 further includes an insert to minimize friction and prevent wear, and provide for simple repairs when worn. Further, the inner walls of the yolk 210 are slightly slotted, or grooved, to slidably receive the extending inserts, or pins, of each of the through-holes 120 of the first brace 100. That is, the inner walls of the yolk 210 can include one or more slots 222 aligned with the through-holes 220 of the yolk 210.

As noted above in regard to the first brace 100, the through-holes 120 can include hardened inserts which can extend a slight distance beyond the surface of the body segment of the first brace 100 to provide pins that can be slidably received within correspondingly sized and positioned grooves 222 in the second brace 200. The engagement between the pins and grooves allows preliminary assembly of the first and second braces 100 and 200 at the through-holes 120 using the yolk 210, such that pins, bolts or other securing means used can be assembled through the through-holes 220 of the yolk 210 of the second brace 200, and through-holes 120 of the first brace 100, without requiring extensive user efforts to hold the first and second braces in position during assembly. Each through-hole can be drilled to an initial diameter and into which a round stock material, such as aluminum round stock, can be inserted. The aluminum round stock material can then be drilled with the correct hole size. Further, the correspondingly sized and positioned grooves for slidably receiving the pins (e.g., the extended portion of the insert extending a slight distance beyond the surface of the body segment), can be sleeved with a friction and noise-reducing material 226, such as nylon.

At one side of the yolk 210, a threaded nut 224 can be positioned at an outer surface at an exit opening of the through-hole 220 to receive a bolt passing though the above arrangement and which can be used to tighten and secure the assembly. In an exemplary embodiment of the present invention, the bolt can be a shouldered bolt such that the assembly can remain rotatable even once the bolt is tightened.

As shown in FIG. 6, the second brace 200 is shown assembled with the platform 300, and the assembly illustrates the rotatable nature of the pin and groove connections used in the embodiment of the present invention. Returning to FIG. 1, once the first brace 100 is in position along an outer tree surface using the first securing mechanism at the lower end, and the second securing mechanism at the upper end, and wherein tension and leveling has been performed using the leveler 160, such an assembled second brace 200 and platform 300 can be easily assembled with the first brace 100.

Figure 4:
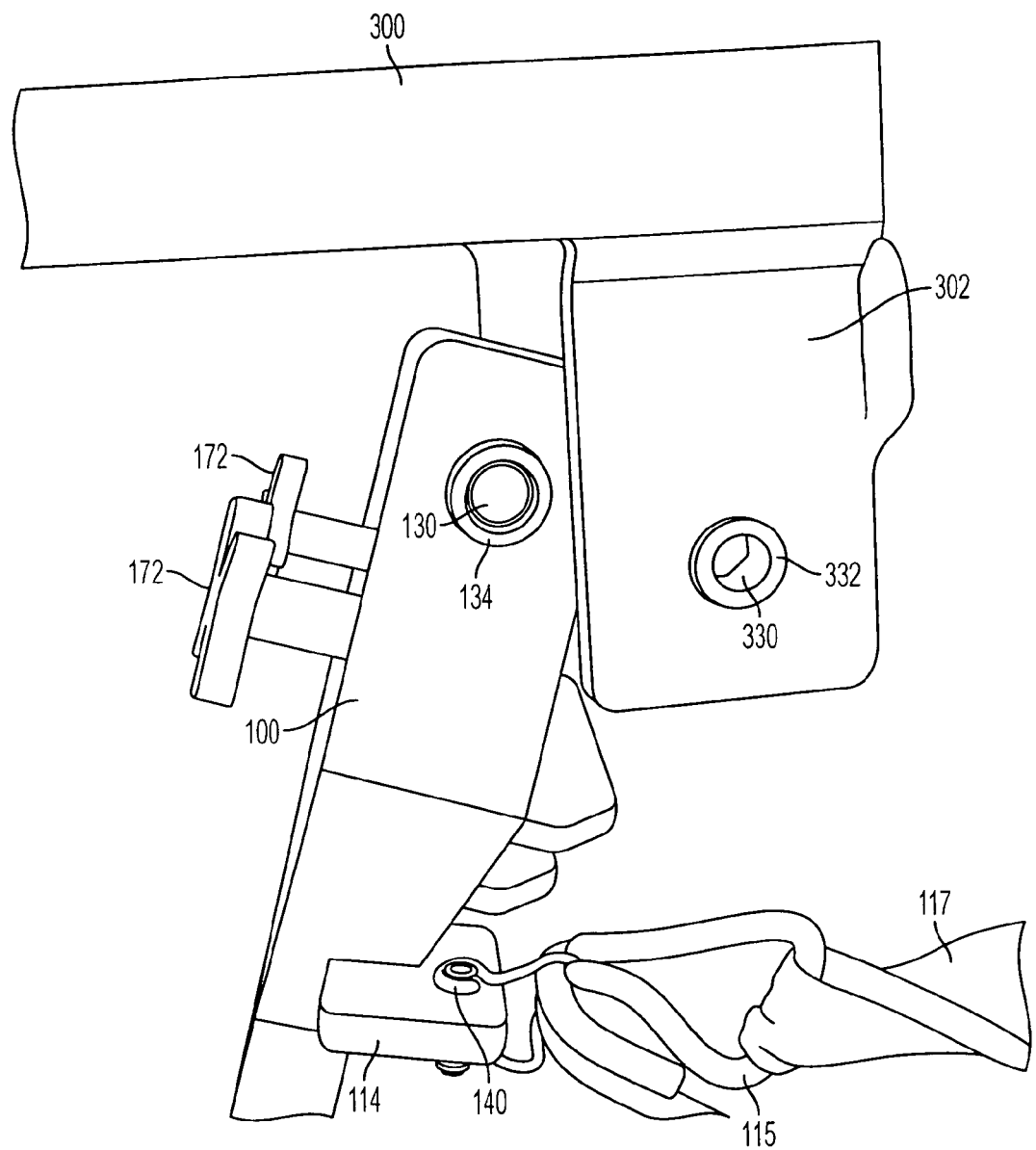
FIG. 4 is a perspective view of a pin and groove connection prior to assembly between the first brace of FIG. 2 and the platform of FIG. 1 in accordance with an embodiment of the present invention.

In an exemplary embodiment of the present invention, the platform 300 includes a substantially flat upper surface including any suitable material supported by a framework secured thereunder. The framework to support the upper surface of the platform can include any suitable support fabricated from square tubing, angle iron or similar materials. In an exemplary embodiment of the present invention, the platform 300 includes a metal frame approximately 23×32 inches and covered with a mesh material, but the invention is not limited thereto. At both front and rear edges of the platform 300, coupling brackets 302 are provided to slidably receive the upper portions of both the first and second braces 100 and 200. In an exemplary embodiment of the present invention, the second brace 200 and the platform 300 are simply provided with rotatable connection means at the front edge of the platform using though holes 230 and once assembled, remain assembled for greater user convenience. Accordingly, the following description of coupling brackets 302 are provided in regard to the coupling between the rear edge of the platform 300 and the upper portion of the first brace 100. FIG. 4 is a perspective view of a pin and groove connection prior to assembly between the first brace 100 of FIG. 2 and the platform 300 of FIG. 1, and FIG. 5 is a perspective view of the pin and groove connection of FIG. 4 after assembly in accordance with an embodiment of the present invention.

Figure 5:
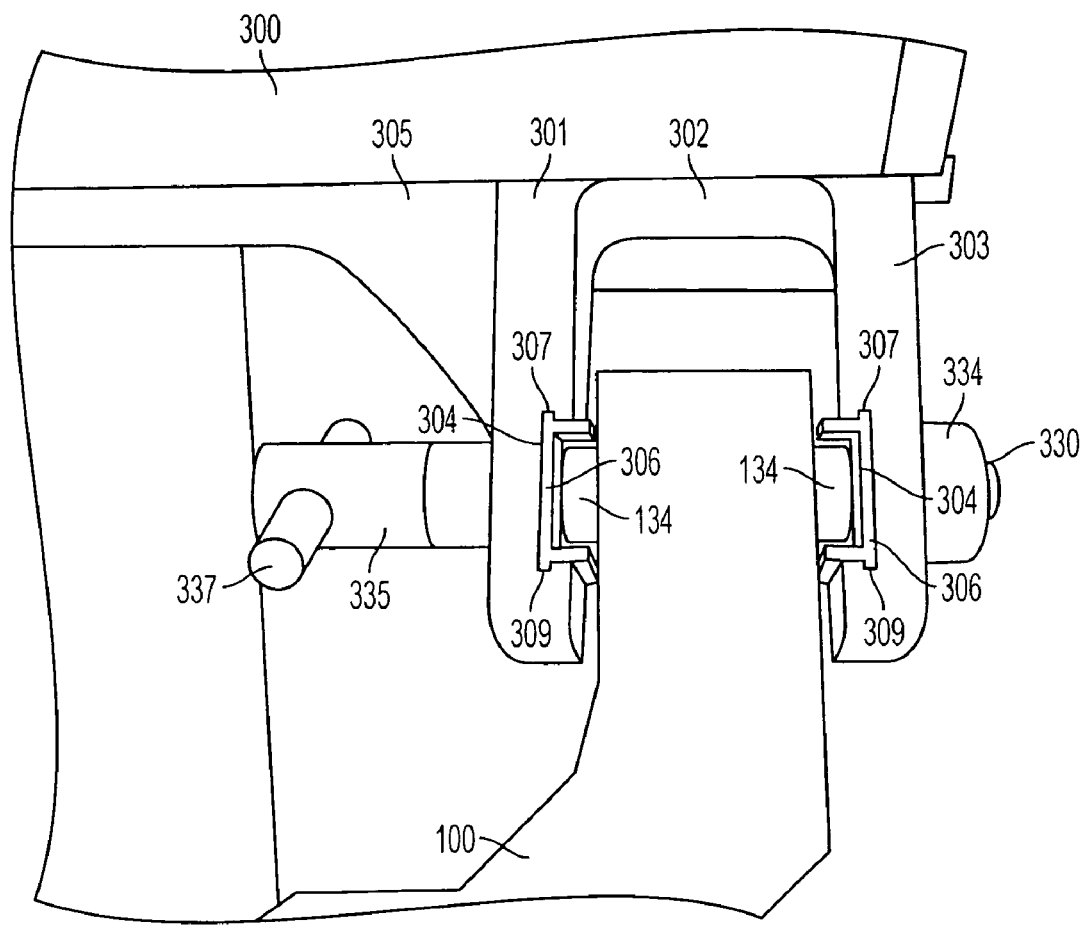
FIG. 5 is a perspective view of the pin and groove connection of FIG. 4 after assembly in accordance with an embodiment of the present invention.
Figure 7:
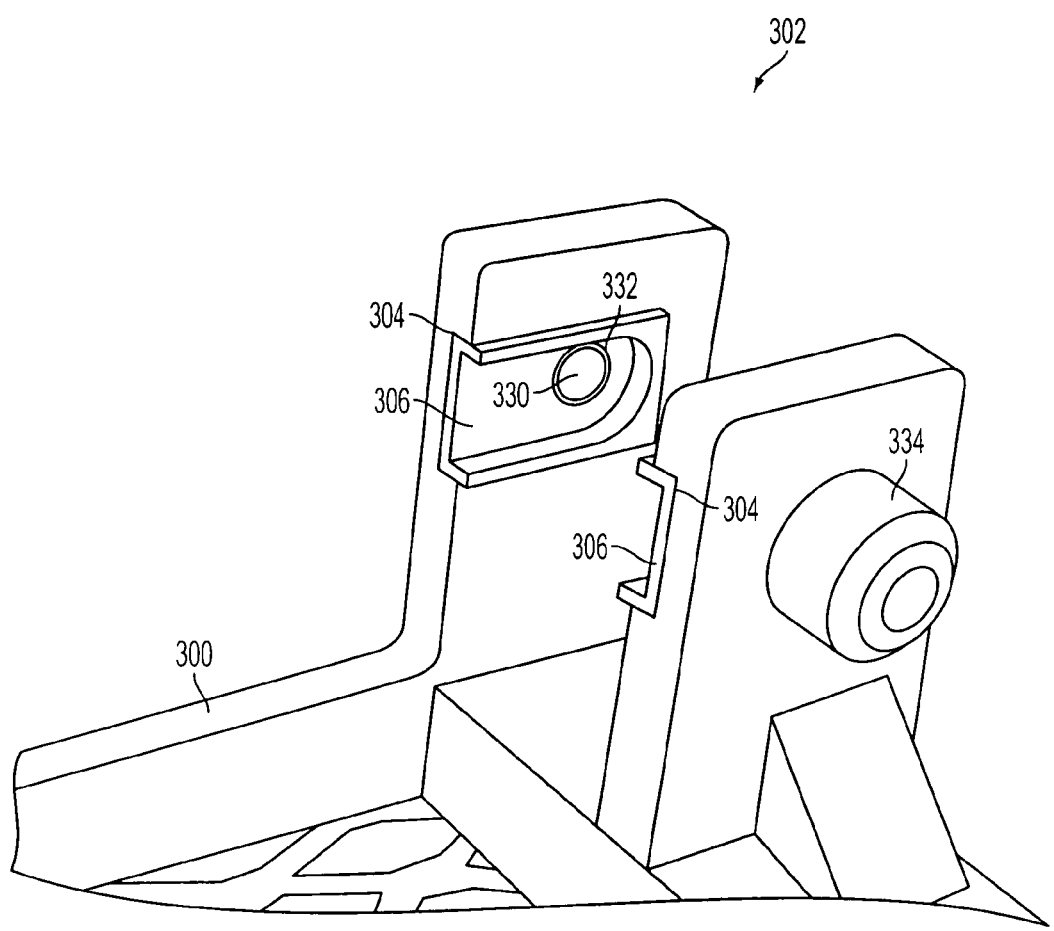
FIG. 7 is a perspective view of a groove connection of one corner of the platform of FIG. 1 prior to receiving the pin connection of either the first or second braces in accordance with an embodiment of the present invention.

Specifically, as shown in FIGS. 4, 5 and 7, each coupling bracket 302 includes opposite sides 301 and 303, and a through-hole 330 that can be between ¼ and ⅝ inches in diameter, with a preferred diameter of about ⅜ inches. At least one of the sides 301 and 303 are braced with a support piece 305. Further, the inner walls of the coupling bracket 302 (as with the yolk 210) are slightly slotted, or grooved, and the groove is sleeved with a friction and noise-reducing material such as nylon to slidably receive the extending inserts of each of the through-holes 130 of the first brace 100. That is, as shown in FIGS. 4 and 5, the inner walls of the coupling brackets 302 include one or more slots or grooves 304 aligned with the through-holes 330 of the brackets 302. These and the other grooves recited elsewhere are substantially channel-shaped and at a point where each parallel wall of the channel reaches the bottom of the channel, further include notches 307 and 309, preferably extending the length of the channel and which are configured to receive a similar but reversed-shaped feature of the insert 306, thereby securing the insert 306 within the channel of the grooves. The grooves 304 further include nylon inserts 306 to minimize friction and prevent wear, and provide for simple repairs when worn. In an exemplary embodiment of the present invention, a coupling bracket 302 is provided at or near each corner of the platform 300 to receive the upper portions of the first brace 100 at a rear edge of the platform 300. Further, as described below, once assembled, each coupling remains rotatable even after tightening of a bolt 335. Each through-hole 330 can be drilled to an initial diameter and into which a round stock material 332, such as aluminum round stock, can be inserted. The aluminum round stock material can then be drilled with the correct hole size. Further, the grooves 304 for slidably receiving the pins (e.g., the extended portion of any insert extending a slight distance beyond the surface of the body segment), are configured to receive and guide the pins into alignment with the through-holes 330 and to facilitate doing so, can be sleeved with a friction and noise-reducing material 306 such as nylon.

As with the yolk 210 of the second bracket 200 described above, a threaded nut 334 can be positioned at an outer surface at an exit opening of the through-hole 330 in each coupling bracket 302 to receive the bolt 335 passing though the above arrangement and which can be used to tighten and secure the assembly. In an exemplary embodiment of the present invention, the bolt 335 can be a shouldered bolt such that the assembly can remain rotatable even when the bolt is tightened, and include a gripping member 337 to allow a user to easily tighten and loosen the bolt as desired.

Further, as more clearly shown in FIG. 4, at each end of the upper portions of the first brace 100, the through-hole 130 (and as with through-holes 120 and 230) can be between ¼ and ⅝ inches in diameter, with a preferred diameter of about ⅜ inches. Further, a hardened insert 134 of each can be provided to extend a slight distance beyond the surface of the body segment of the first brace 100 to provide a pin-type mechanism to be slidably received within correspondingly sized and positioned grooves 304 in the brackets 302 of the platform 300. The engagement between the pins and grooves allows preliminary assembly of the first brace 100, second brace 200, and the platform 300, such that pins, bolts or other securing means can be assembled through the through-holes of each pin and groove without requiring extensive user efforts to hold the first brace and platform in position during assembly. The inserts 306 of the grooves 304 (as with any of the wear inserts of the grooves) are constructed of any suitable material, such as nylon. The hardened inserts 134 (as with any of the hardened inserts of the through-holes to provide the pins) are constructed of any suitable material, such as aluminum round stock material drilled with the correct hole size.

As noted above in regard to the first brace 100, the through-holes 130 include hardened inserts 134 which can extend a slight distance beyond the surface of the body segment of the first brace 100 to be slidably received within correspondingly sized and positioned grooves 304 in the rear edge brackets 302 of the platform 300. Further, in regard to the second brace 200, the second brace 200 and the platform 300 can be simply provided with rotatable connection means at the front edge of the platform and once assembled, remain assembled for greater user convenience. The engagement between the pins and grooves allows preliminary assembly of the first and second braces 100 and 200, and the platform 300, at the through-holes 130 and 330, using the coupling brackets 302, such that pins, bolts or other securing means can be assembled through the brackets 302 and through-holes 130 of the first brace 100, without requiring extensive user efforts to hold the first and second braces, and the platform in position during assembly. In an exemplary embodiment of the present invention, the bolts can be shouldered bolts such that the assembly can remain rotatable even when the bolt is tightened.

In an exemplary installation method of the platform assembly, the first brace 100 is first secured to a tree. Any number of first braces can be secured to different locations as desired by the user. As the exemplary features of embodiments of the present invention provide for interchangeability, a platform 300 and second brace 200 can be compactly carried between locations (see for example FIG. 11) and used at each first brace 100.

The installation of the first brace 100 simply requires positioning the first brace 100 at the desired location such that the first and second securing mechanisms can be used. Specifically, the first securing mechanism comprising the V-shaped first and second flat members 110 and 112 can be positioned to receive and secure the tree surface at a lower portion of the first brace 100. The second securing mechanism can be placed to circumvent the tree and can then be tightened to secure the first brace 100 to the tree surface. Further, the leveling mechanism 160 can be moved either in or out against the tree surface to adjust the level of the platform angle and to put tension on the second securing mechanism, thereby allowing the user to set the degree of security between the first brace 100 and the tree.

Once in position, the first brace 100 can receive the platform 300 and second brace 200. As the couplings at each through-hole can freely rotate even when assembled, the order of the subsequent assembly steps can be arranged in any desired order. For example, the second brace 200 can be assembled with the front edge of the platform 300 as described above (see for example, FIG. 6), and then the back edge of the platform 300 can be assembled with the upper portion of the first brace 100 as described above. The platform 300 can be assembled with the first brace 100 at an angle that is easiest for the user, and then rotated through the free rotation of the coupling brackets 302 at the rear edge and at coupling points at the front edge of the platform 300 into a final substantially perpendicular position. At this time, the second brace 200, currently rotatably secured to the front edge of the platform 300 as described above, can be rotated into position such that the yolk 210 can be secured to the first brace 100 using any one of the through-holes 120 as described above to control the angle and level the platform 300.

In each position, the arrangement of grooves and extended inserts or pins of the though holes allows a user to assemble one or more pieces, and then install pins, bolts or other securing means without requiring extensive user efforts to hold pieces in position during assembly. Further, the use of interchangeable and freely connectable components, allows a user to install at least the first brace 100 at a location, or a number of locations, and a user can then carry only the platform 300 and second brace 200 between locations, and still quickly and quietly install each for use.

Figure 8:
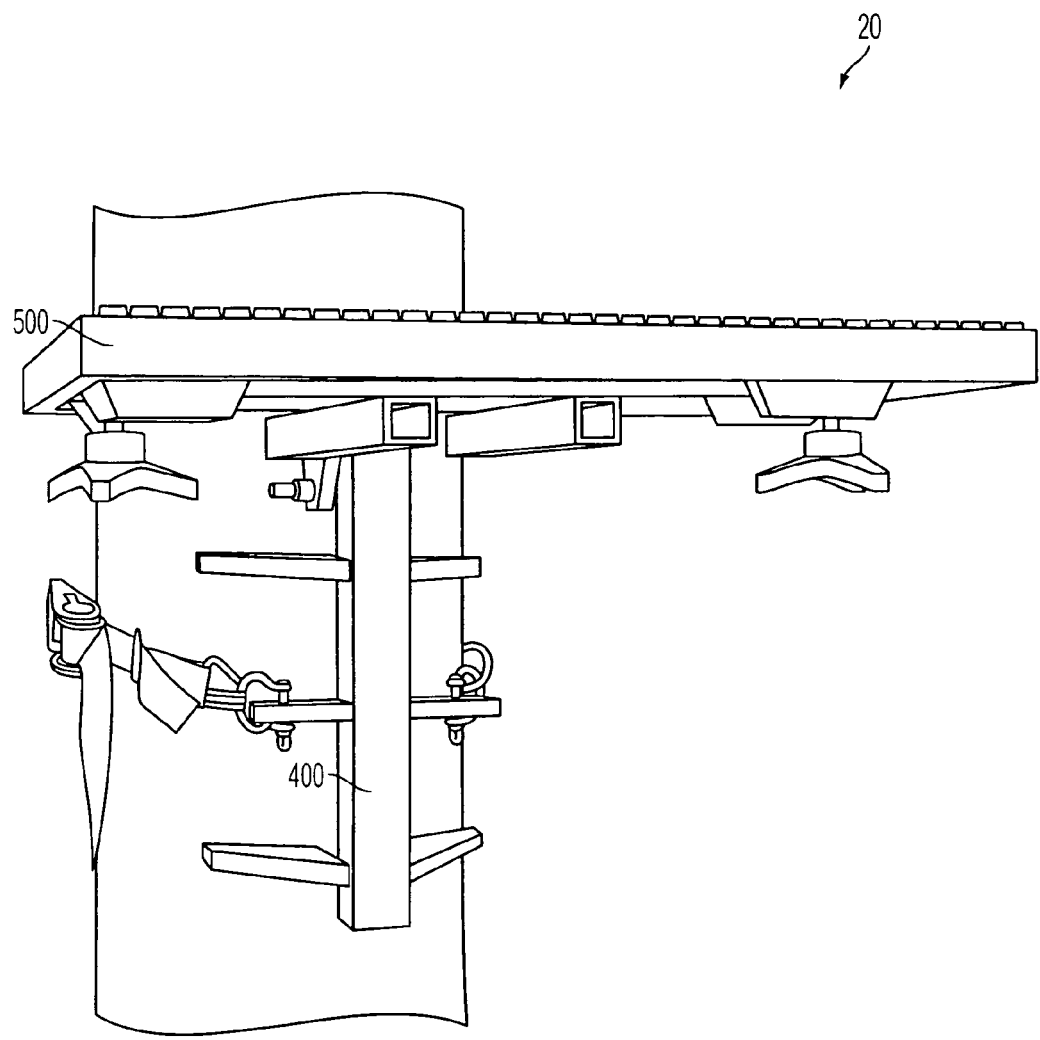
FIG. 8 is a perspective view of the assembled and positioned seat assembly of FIG. 1 in accordance with an embodiment of the present invention.
Figure 9:
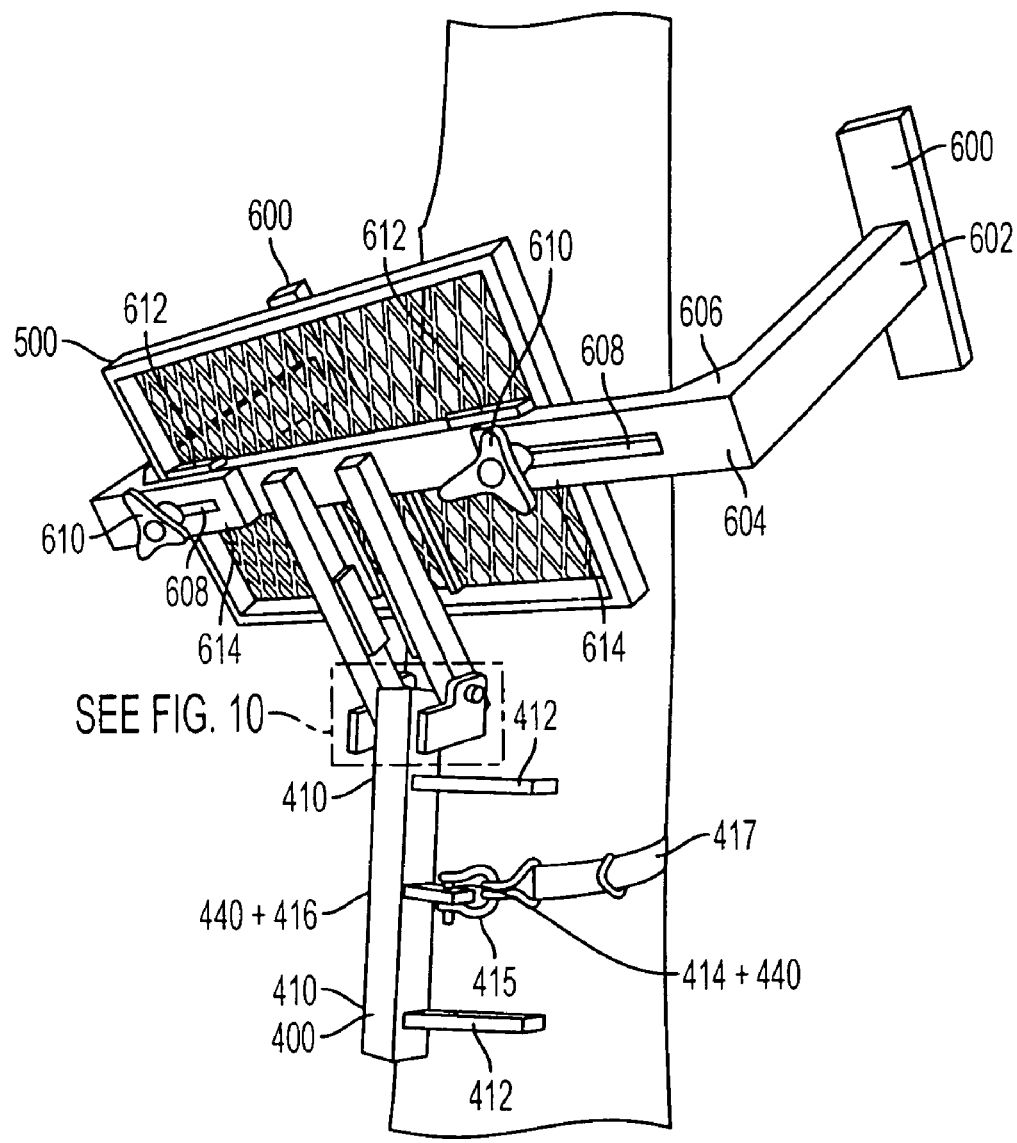
FIG. 9 is a perspective view of the assembled and positioned seat assembly of FIG. 1 in a rotated position in accordance with an embodiment of the present invention.

As noted above, the platform assembly can be provided and installed separately from any other required components. However, in an exemplary embodiment of the present invention, the platform assembly is provided for use with a seat assembly, such that the user can install the first brace 100 at a location, and then carry the seat assembly, platform and second brace in a compact arrangement between locations (see for example, the assembly of FIG. 11). FIG. 8 is a perspective view of the assembled and positioned seat assembly and FIG. 9 is a perspective view of the assembled and positioned seat assembly of FIG. 1 in a rotated position in accordance with an embodiment of the present invention.

In an exemplary embodiment of the present invention, the seat assembly 20 includes a seat brace 400, seat 500, and armrests 600. In an exemplary embodiment of the present invention, the seat brace 400 is between 18 and 15 inches long, and preferably is 11 inches long, and includes an upper and lower portion. The body of the seat brace 400 includes a number of incremental first securing mechanisms to firmly press against the tree surface. The first securing mechanisms include first and second flat members 410 and 412 which are secured to the body of the seat brace at increments of 1½ inches from the bottom, and are constructed of flat stock welded to the seat brace 400 and extend perpendicular to the seat brace 400 to form a V-shape in which to receive and secure the tree surface. In an exemplary embodiment of the present invention, the cleats 410 and 412 of the first securing mechanism are secured to the seat brace 400 and extend in a perpendicular manner from the seat brace 400 and provide a V-shaped opening in which to receive the tree surface. The first and second flat members 410 and 412 are constructed of flat stock welded to the seat brace and forming the V-shape in which to receive and secure the tree surface. A number of holes can be provided in each of the flat members 410 and 412 to reduce the weight of the device. In an exemplary embodiment of the present invention, the cleats 410 and 412 of the first securing member are preferably flat aluminum stock cut to provide a 22.5 degree angle contact surface with the tree. Although the sizes and dimensions mentioned herein are exemplary and work well, those skilled in the art will understand that other sizes and dimensions can also be used within the scope of this invention.

At an approximate midpoint of the seat brace 400, the seat brace 400 further includes a second securing mechanism, substantially similar to the second securing member of the platform assembly described above, to circumvent the tree and which can be tightened to secure the seat brace 400 to the tree surface. At a midpoint of the seat brace 400, planar members 414 and 416 can be provided on each side for securing a belt, ratchet strap, cable or other means to circumvent the tree and secure the seat brace 400 to the tree surface. Each planar member 414 and 416 extends from the seat brace substantially parallel to the seat 500, and includes throughholes 440, which can be formed in a manner substantially the same as those of through-holes 140. Any number of suitable ratchet strap, belt, chain or cable mechanisms can be used to circumvent the tree and affix to the through-holes 440 of members 414 and 416, and which can further include a tension mechanism to create a degree of tension in the ratchet strap, belt, chain or cable. The strap 417, belt, chain or cable can be attached with a device such as a clevis 415 on one end, and the other end can slide through the hole in the flat stock of the planar member 414 or 416, and be pulled tight then slide into a slot that connects into the hole to lock the strap, belt, chain or cable down.

Figure 10:
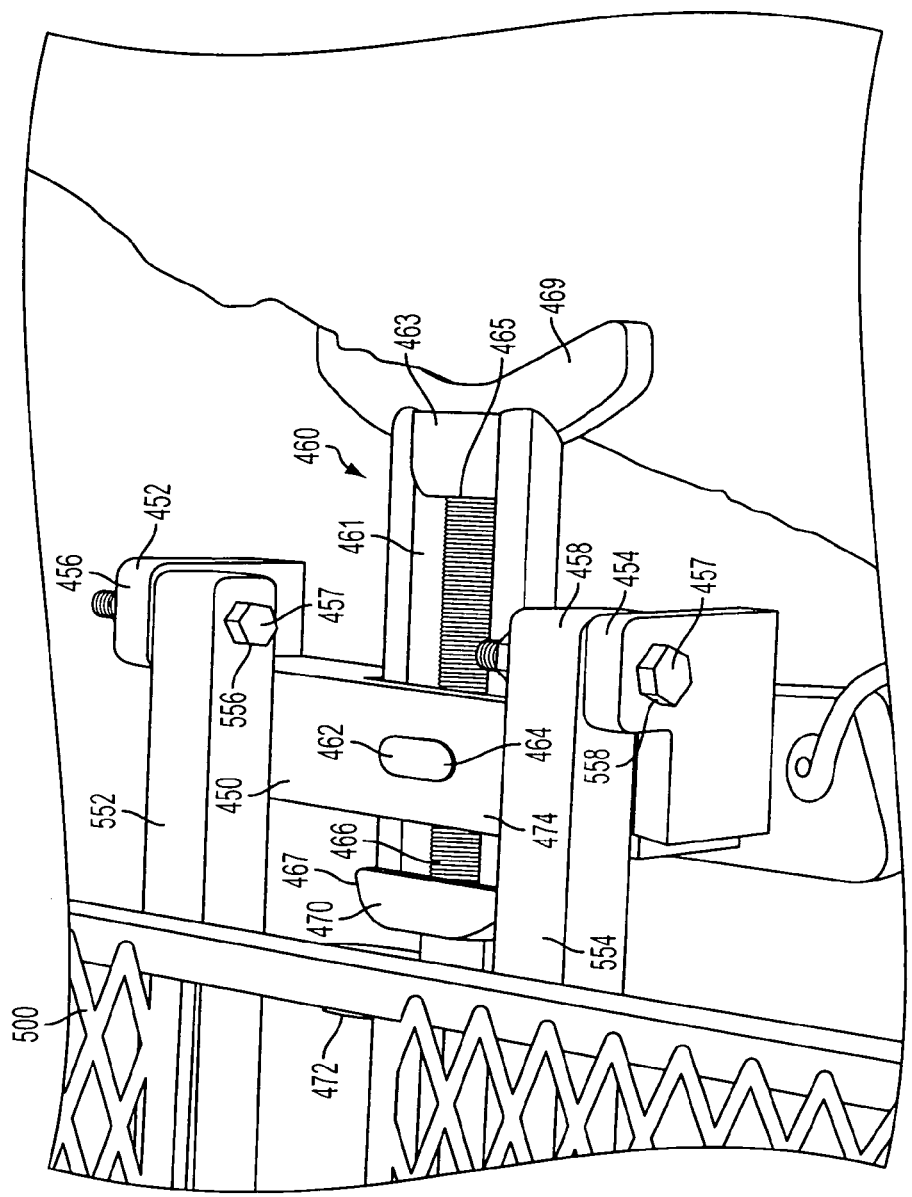
FIG. 10 is a perspective view of a leveler of the seat of FIG. 8 in accordance with an embodiment of the present invention.

At an upper portion of the seat brace 400, a span and leveler are provided. FIG. 10 is a top view of the leveler 460 and span member 450 of the seat brace 400 in accordance with an embodiment of the present invention. At the upper portion of the seat brace 400, the span member 450 is provided and includes a member extending between sections 452 and 454, which rotatably couple with sections 552 and 554 at the rear of the seat 500 as described in greater detail below. At a substantially midpoint section of the span member 450, a slot 462 of the leveler 460 is provided into which a threaded nut 464 is captured by the threaded rod 466. The threaded rod extends between opposite ends of a slide 470. At a first end of the slide 470, knob 472 is provided to turn the threaded rod 466 engaged with the nut 464 which serves to move the slide 470 in a back and forth manner.

The opposite end of the slide 470 is configured to provide a V-shaped contact surface 469 to align with a curvature of the tree surface and prevent twisting forces against the leveler 460. The slide 470 passes though the opening 474 in the span member 450, which is provided with inserts 476 to minimize friction and prevent wear, and provide for simple repairs when worn. By selectively turning the knob 472, the slide is moved back and forth within the opening 474 as captured by the nut 464. When contact between the slide 470 and the tree surface occurs, the span member 450 can be forced away from the tree surface to adjust the level of the seat angle and to put tension on the second securing mechanism in a manner substantially similar to the leveler of the platform described above, thereby allowing the user to set the degree of security between the seat brace 400 and the tree. In an exemplary embodiment of the present invention, the slide 470 includes a ⅝ inch flat stock piece that is 2.5 inches wide and 8 inches long. The slide 470 is slotted in the middle, and the threaded rod 466, preferably a ⅝ inch bolt, is inserted through the slot for adjustment.

Specifically, the slide 470 has a 1¼ inch wide slot 461 cut through the middle of the flat stock. At the end where the slide 170 contacts the tree, a round stock piece 463 is welded in place on the inside of the slot, and into which, a hole is drilled concentric with the axis of the threaded rod 466. A bronze insert 465, preferably having a ¾ inch outside diameter and a ½ inch inside diameter, is pressed into the hole of the round stock piece 463. One end of the ⅝ inch bolt 466 is turned down to a reduced diameter (i.e., ½ inches) for a length of about ½ inches, and which is then positioned into the opening of the bronze insert 465 of the round stock piece 463.

The other end of the ⅝ inch bolt 466 is also turned down to a reduced diameter (i.e., ½ inches) for a length of ¾ inches to slide through a similar bronze insert on the knob end. This end of the ⅝ inch bolt 466 can then be extended another ½ inches and includes ⅜ inch threads on the outer surface upon which the knob 472 can be threaded.

On the back of the slide 470 at the knob there is a 1 inch thick by 1 inch tall by 2½ inch long cap 467. The cap 467 is slotted on both sides to slide onto the end of the flat stock of the slide 470, and includes a ¾ hole concentric with the axis of the threaded rod 466 to accept a bronze insert having a ½ inner diameter through which the end of the ⅝ inch bolt 466 can be extended and upon which the knob 472 can be threaded. The cap 467 is welded into place at the end of the slide 470. Although the sizes and dimensions mentioned herein are exemplary, those skilled in the art will understand that other sizes and dimensions can also be used within the scope of this invention.

As noted above, an upper portion of the seat brace 400 includes the span member 450 extending between sections 452 and 454, which rotatably couple with sections 552 and 554 at the rear of the seat 500 as described in greater detail below. Further, the span member 450 supports the sections 552 and 554 at the rear of the seat 500, thereby providing support of the seat.

Though holes 456 and 458 can be provided to engage with through-holes 556 and 558 of sections 552 and 554 in a manner substantially similar to the through-holes, inserts and extendable hardened inserts, and grooves and inserts, as described above to provide a pin and groove assembly. As noted above, such a pin and groove allows preliminary assembly of the seat brace 400 and the seat 500, at the through-holes of each such that pins, bolts or other securing means can be assembled through each without requiring extensive user efforts to hold the seat brace and the seat in position during assembly. In an exemplary embodiment of the present invention, the bolts 457 can be shouldered bolts such that the assembly can remain rotatable even when the bolts are tightened. As illustrated in FIG. 9, the seat 500 is rotatable, which further allows leveling of the seat 500 using the leveler 460 described above.

In an exemplary embodiment of the present invention, the seat 500 includes a substantially flat upper surface comprising any suitable material supported by a framework secured thereunder. In an exemplary embodiment of the present invention, the seat 500 comprises a metal frame approximately 12×24 inches and covered with a mesh material, but the invention is not limited thereto. At a rear edge of the seat 500, the sections 552 and 554, including the through-holes 556 and 558 are provided to receive the upper portion of the seat brace 400.

Further, at opposite sides of the seat 500, a first and second armrest 600 can be provided. As shown in FIG. 9, each armrest 600 includes an upper portion 602 having a substantially flat surface extending approximately 8 inches. An L-shaped member 604 can be provided to support the upper portion 602, and can be provided with a reinforcement member 606. The L-shaped member further includes slots 608 through which a bolt and enlarged tightening nut 610 can be provided. Accordingly, a user can loosen the enlarged tightening nuts 610 and adjust the positions of the first and second armrests 600 as guided by the slots 608. Two tabs 612 and 614 stick out under each side of the seat 500 to guide the slotted portions of the armrest 600 straight in and out to prevent side to side movement.

The seat brace 400 and armrests 600 can be constructed of any suitable material, preferably 1 inch square steel or aluminum stock to facilitate strength and light weight. Each can be further treated to prevent rust or corrosion, and/or provide a friction surface which is easier to grasp and hold. In an exemplary embodiment of the present invention, the armrests 600 are constructed of 1"×2"×⅛" steel tube for strength, and include a 7/16 inch slot 608 cut length wise where the enlarged tightening nuts 610 connect it to the under side of the seat 500.

In an exemplary installation method of the seat assembly, the seat brace 400 is first secured to a tree. Any number of seat braces can be secured to different locations as desired by the user. As the exemplary features of embodiment of the present invention provide interchangeability, a seat 500 and armrests 600 can be carried between locations and used at each seat brace 400.

The installation of the seat brace 400 simply requires positioning the seat brace 400 at the desired location such that the first and second securing mechanisms can be used. Specifically, the first securing mechanism comprising the V-shaped first and second flat members 410 and 412 can be positioned to receive and secure the tree surface. The second securing mechanism can then be placed to circumvent the tree and can then be tightened to secure the seat brace 400 to the tree surface.

Once in position, the seat brace 400 can receive the seat 500 and armrests 600. As the couplings at each through-hole can freely rotate, the order of the subsequent assembly steps can be arranged in any desired order. For example, the seat 500 can be assembled with the upper portion of the seat brace 400 as described above, and leveled as desired by the user using the leveler 460. One or more of the armrests 600 can then be assembled with the seat 500 as described above.

In an exemplary embodiment of the present invention, the platform and seat assemblies are used together to provide a quick and convenient system and method for a tree based observation point. Embodiments of the present invention provide a number of benefits, including the security associated with the use of the first and second braces 100 and 200. Conventional designs use only one brace under a platform. This means that if the user puts a platform up and the one brace slips, the platform will fail. Such a design has the back of the platform unsupported from underneath, and relies on cleats on a back position and a ratchet strap to secure and hold the back of the platform up, so if both fail, the platform will again fail. Further, such designs make the platform difficult for a user to install and increases the chance of injuries.

In an exemplary embodiment of the present invention, the first and second braces 100 and 200 are preferably secured together at the lower portion with quick disconnects and/or bolts, but are not limited thereto. Any number of suitable mechanisms can be used as required by the application. The first and second braces can also be secured to the platform with quick disconnects and/or bolts, but are not limited thereto. Accordingly, the first brace 100 that extends vertically along the tree surface, downward from the back edge of the platform 300, can be disconnected from both the platform 300 and the second brace 200 by simply removing three bolts, and separating the quick disconnect features provided by the pin and groove mechanisms. This allows the user to install the first brace 100 without the platform 300 and/or the second brace 200. Accordingly, any number of first braces 100 can be installed for example, on several trees at different locations, and a platform 300 and second brace 200 can be moved between each, in an easily transported configuration as shown in FIG. 1, and installed with any one of the various first braces as desired.

Figure 11:
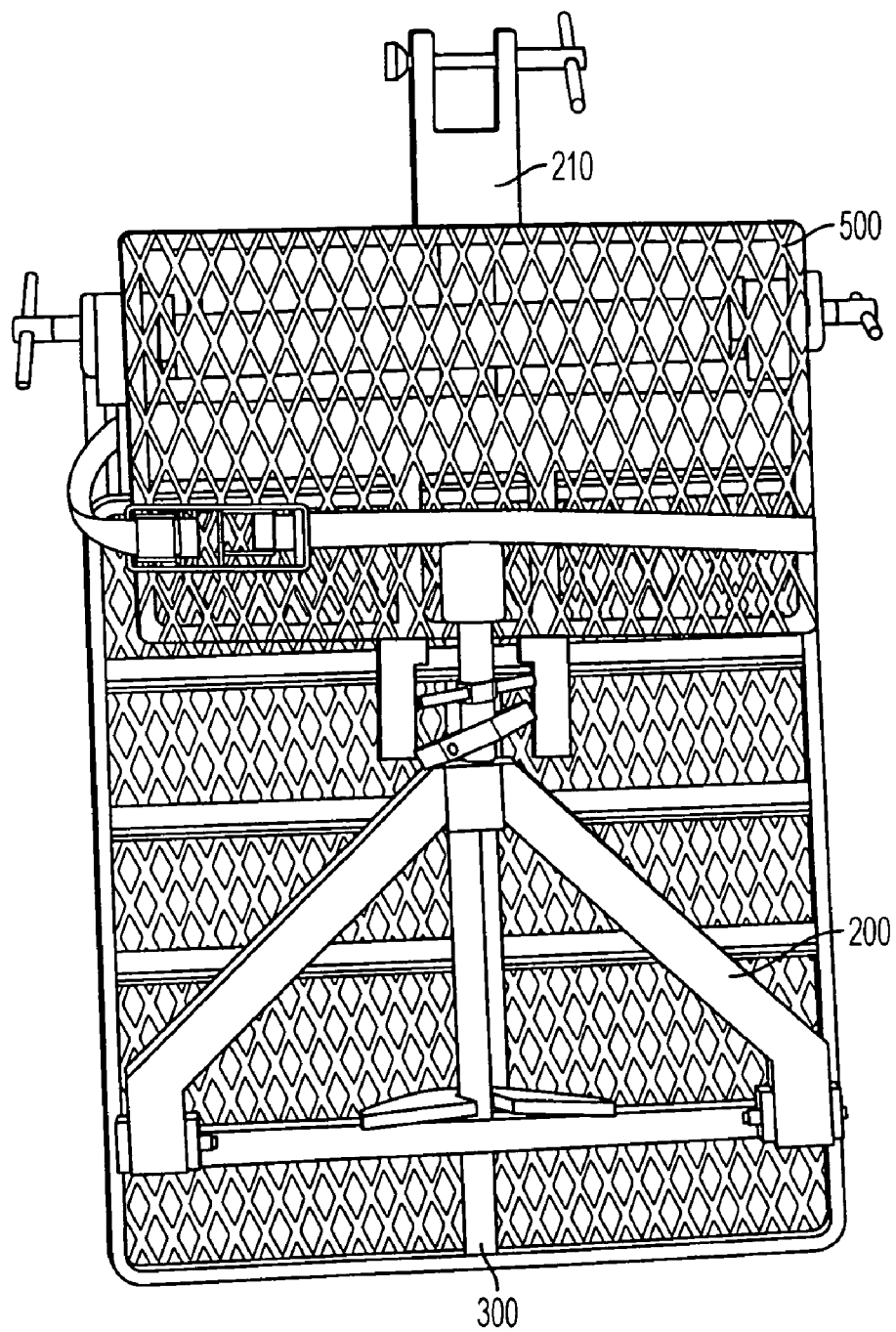
FIG. 11 is a perspective view of the platform and seat assembly of FIG. 1 which can be carried in accordance with an embodiment of the present invention.

As shown in FIG. 11, in exemplary embodiments of the present invention, the platform 300 and seat 500 fold flat and the cleats on the seat lock onto the down brace with a strap for easy transporting.

Further, the seat assembly can be independent of the platform assembly, and can be adjusted for a user's preferred height with respect to the platform. The seat brace 400 can be separated from the seat 500 with the same quick disconnect as the first brace 100 of the platform assembly to allow a user to leave the platform first brace 100 and seat brace 400 on a particular tree for future reinstallation. Once assembled, the seat 500 can be leveled for varying tree angles with the adjustable bolt of the leveler 460.

Exemplary embodiments of the present invention include at least two braces under the platform that connect together creating a structurally sound platform unlike other devices with only a single brace. The down or first brace 100 that attaches to the tree can be separated from the platform 300, and then the platform can be put on with the quick disconnects on the first brace and the underside of platform, which makes it quick and easy. The brackets 302 on the platform 300 and round sleeves or extended inserts on the first and second braces 100 and 200 slide together and hold the platform unsupported until bolts or other means are inserted. Such a technique is easier and safer for a user than putting the entire device up at once.

Further, according to embodiments of the present invention, one or more of the platform and braces are interchangeable. For example, a user can obtain a plurality of down or first braces 100 and one or more platforms 300, giving the user the ability to put all the first braces up and move the platforms around as needed. Conventional devices do not provide such braces under the platform with a quick disconnect feature to separate the platform from the brace while leaving the down brace on the tree for future use. That is, by putting just the down or first braces on the tree, that is, without being required to install the seat structure simultaneously, allows for safer and easier installation as opposed to having to put up an entire stand at once.

According to one embodiment of the present invention, installation and leveling can be performed by turning the leveler in all of the way closest to the device for chain attachment. Then run a chain around tree and turn the leveler out to apply tension. For ratchet straps, the leveler can be turned out until both slides contact the tree, then tighten ratchet strap. Platform leveling can be achieved by the selection of the optimal through-hole 120 of the first brace 100 at the tree. The second brace 200 from the outer end of the platform 300 can then attach to one of the multiple through-holes 120 for leveling. Seat leveling can be achieved by turning the leveler substantially as for the platform. Seat armrests, described above as preferably comprising 1×2×⅛ inch square tube having a 7/16 inch slot cut out of the armrest where the bolt secures it to the under part of the seat, can be adjusted in or out for different sized trees or as desired by the user. The two bolts and armrests can also be removed entirely from the seat assembly. As noted above, there are also two tabs on both sides of the armrest to keep it from pivoting away from the user so there is no side to side movement.

In an exemplary embodiment of the present invention, the seat and seat brace include a quick disconnect similar to the first brace and platform. In doing so, it can be removed from the seat brace in a manner substantially similar to the first brace of the platform, and can be left for later use.

In the embodiments of the present invention described above, slots/grooves of the quick disconnects are nylon sleeved. The nylon is slotted to accept the pins of braces as described above, and align the through-holes of each member such that a bolt can then be inserted to secure the assembly. The nylon of the slots/grooves can be installed in the aluminum and allows for replacement if damaged by simply pressing out and pressing a new one in.

According to exemplary embodiments of the present invention, two braces are used, and are connected in such a manner to provide a rigid and secure connection. If the platform slips, it will stay in position without falling. Further, most conventional devices have tapered platforms at the tree. The user has to step farther from the ladder or steps to get to the platform. According to at least one embodiment of the present invention, however, the platform is square, so the distance is shorter. Further, there are no cables coming down from above the platform which can obstruct entry.

Also, conventional devices require a user to install the entire stand at one time, which can be bulky and unsafe. According to embodiments of the present invention, however, the down brace, or first brace 100, can be removed and put up instead of the entire stand.

Still further, with conventional devices, any quick disconnects that are used are provided as an additional accessory. According to embodiments of the present invention, however, quick disconnects are integrated as parts of the stand. In a number of conventional devices, a chain attachment for securing the stand is put around the tree as tight as possible and then the stand is pushed down the tree to secure the stand into position. According to embodiments of the present invention, however, a chain is put around the tree and the top cleats/bolts of the securing mechanisms are turned to extend and apply tension on the chain to an extent desired by the user.

Still further, with conventional devices the stand is leveled with only one brace underneath. The brace has to be moved up or down while the desired position is found and the strap has to be put around the tree without moving. According to embodiments of the present invention, however, there are three round stock sleeve adjustments on the first brace to hold the second brace from the outer end of the platform unsupported while the bolt is being secured for large adjustments.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:
1. A pole or tree mounted device, comprising:
 a platform assembly, having a platform, and first and second braces, wherein the first brace is configured to be secured in a substantially vertical position along a mounting surface, and wherein the second brace and platform are configured to rotatably couple with the first brace;
 a seat assembly, having a first brace configured to be secured in a substantially vertical position along the mounting surface;

a platform leveler having at least one threaded member to move the first brace of the platform assembly in a substantially perpendicular direction relative to the mounting surface and a plurality of through-holes at a lower end of the first brace of the platform assembly, a selected one of the through-holes for coupling with a lower end of the second brace of the platform assembly; and a seat leveler having at least one threaded member to move the first brace of the seat assembly in a substantially perpendicular direction relative to the mounting surface, wherein the plurality of through-holes at the lower end of the first brace of the platform assembly have at least one insert which extend beyond respective one or more of the through-holes; and the lower end of the second brace of the platform assembly includes a yolk having a through-hole and insert, wherein the yolk is grooved to receive the extended insert of at least one of the plurality of through-holes at the lower end of the first brace of the platform assembly to control an angle of rotation of the platform.

2. The device as recited in claim 1, wherein the first brace of the platform assembly further includes a first securing member at a lower portion of the first brace to engage the mounting surface.

3. The device as recited in claim 2, wherein the first brace of the platform assembly further includes a second securing member to circumvent the mounting surface, wherein the platform leveler is configured to move the first brace of the platform assembly in a substantially perpendicular direction relative to the mounting surface and in response, control tension in the second securing member.

4. The device as recited in claim 3, wherein the second securing member includes at least one of a chain, ratchet strap, strap and cable.

5. The device as recited in claim 1, wherein the first brace of the seat assembly further includes first securing members at incremental portions of the first brace to engage the mounting surface.

6. The device as recited in claim 1, wherein the first brace of the seat assembly further includes a second securing member at a midpoint of the first brace to circumvent the mounting surface, wherein the seat leveler is configured to move the first brace of the seat assembly in a substantially perpendicular direction relative to the mounting surface and in response, control tension in the second securing member.

7. The device as recited in claim 6, wherein the second securing member includes at least one of a chain, ratchet strap, strap and cable.

8. The device as recited in claim 1, wherein the first brace of the platform assembly further includes an upper portion having parallel ends for coupling with respective corners of a rear edge of the platform, each parallel end having a through-hole and insert wherein each insert extends beyond the through-hole, and the second brace of the platform assembly further includes an upper portion having parallel ends for coupling with the platform, each parallel end having a through-hole and insert wherein each insert extends beyond the through-hole.

9. A pole or tree mounted device, comprising:

a platform assembly, having a platform, and first and second braces, wherein the first brace is configured to be secured in a substantially vertical position along a mounting surface and has an upper portion with parallel ends for coupling with respective corners of a rear edge of the platform, each parallel end having a through-hole and insert wherein each insert extends beyond the through-hole, and the second brace and platform are configured to rotatably couple with the first brace, the second brace of the platform assembly having an upper portion with parallel ends for coupling with the platform, each parallel end having a through-hole and insert wherein each insert extends beyond the through-hole; and a seat assembly, having a first brace configured to be secured in a substantially vertical position along the mounting surface, wherein the platform of the platform assembly further includes first and second brackets at opposite ends of a rear edge for coupling with the parallel ends of the upper portion of the first brace of the platform assembly; and the platform of the platform assembly further includes third and fourth brackets at opposite ends of the platform for coupling with the parallel ends of the upper portion of the second brace of the platform assembly, and each of the brackets of the platform includes a through-hole and insert, and each bracket and insert are grooved to receive the extended inserts of the first and second braces of the platform assembly.

10. A device as recited in claim 9, wherein the seat assembly further includes at least one adjustable armrest.

11. The device as recited in claim 9, wherein each through-hole is configured to receive at least one of a bolt or pin.

* * * * *